J. BEAUMONT & F. G. WHITE.
ELECTRIC BLOCK SIGNAL APPARATUS.
APPLICATION FILED MAR. 21, 1912.
1,093,597.
Patented Apr. 21, 1914.
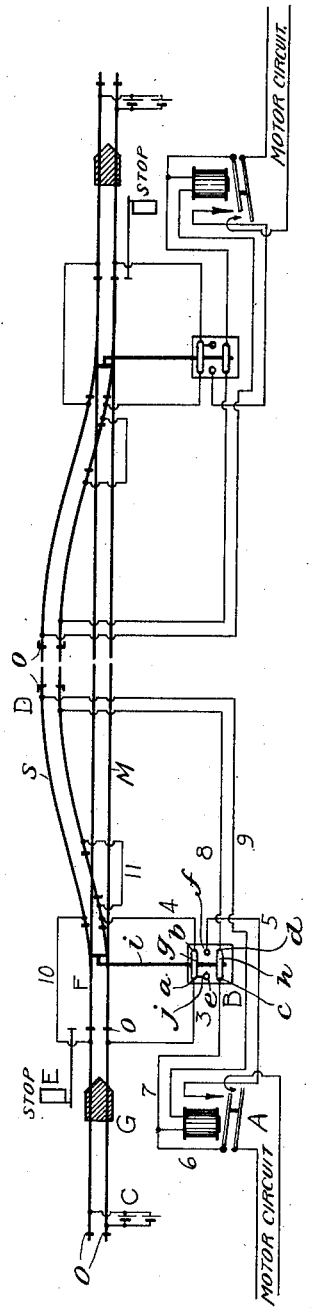
Witnesses
Inventors

UNITED STATES PATENT OFFICE.

JOSEPH BEAUMONT AND FREDERICK G. WHITE, OF CHICAGO, ILLINOIS.

ELECTRIC BLOCK-SIGNAL APPARATUS.

1,093,597.  Specification of Letters Patent.  Patented Apr. 21, 1914.

Application filed March 21, 1912. Serial No. 685,393.

*To all whom it may concern:*

Be it known that we, JOSEPH BEAUMONT and FREDERICK G. WHITE, citizens of the United States, residing at Chicago, in the county of Cook and State of Illinois, have invented certain new and useful Improvements in Electric Block-Signal Apparatus, of which the following is a specification.

Our invention relates to block signals for controlling the movements of trains from main to side tracks, and vice versa, and has for its chief objects, first, to make the signal display a stop indication, and maintain such indication, when a train or engine is moving from the main track to a passing track or side track and until such train or engine has cleared the main track and is clear of main track movements of cars or engines or both. Second, to make the signal display a clear indication when a train or engine is moving from a passing track or side track to the main track, with the main track unobstructed ahead of the signal. Third, to make the signal display a stop indication when a train, engine or car, standing on the passing track or side track is in such position as to interfere with main track movements of cars or engines, when the main track switch is set for main track movement. Fourth, the simplification of the apparatus used for indicating when the tracks are clear or obstructed.

We will describe our invention as applied to a gravity-returned semaphore system, controlled through a motor circuit. The arrangement is such that when the motor circuit is closed the signal is automatically set to "proceed" indication, and when the motor circuit is opened the signal is automatically set to "stop" indication.

As the signal apparatus is not a part of the present invention it will be sufficient for our purposes to describe the means employed for opening and closing the motor circuit.

In the accompanying drawing, M represents a main track and S a side track, both of which are electrically divided into sections by insulated rail joints O. Passage between the main and side tracks is controlled by a switch F, which may be of any ordinary construction. Mechanically connected in any convenient manner with the switch F is an electrical switch or circuit controller B. This switch B comprises contacts $a$—$b$, $c$—$d$, and $e$—$f$, and switch blades $g$ and $h$ connected by rod $i$ with the track switch F. The arrangement is such that when the switch F is set for through movements on the main track the switch blades $g$ and $h$ will connect contacts $a$—$b$ and $c$—$d$ respectively, as shown on the drawings, and when the switch blade is shifted to connect the side track with the main track, switch blade $g$ will connect contacts $e$—$f$, contacts $a$ and $e$ being permanently connected by a conductor $j$.

The signal E is controlled by a motor circuit which is opened and closed by a relay A. This relay receives current from a battery C bridged upon one section of the track, which is normally connected with other sections beyond insulated joints by wire loops 3, $g$, and 4, and 10 and 11. The sections of track so connected together include one section of main track on one side of the switch F and one section of side track on the other side of said switch F. The main track section so connected extends beyond the signal E to a length which is considered as safe in ordinary operation, and is represented in the drawing by the location of the battery C. The limit of the side track connection is represented by D, shown located at the beginning of the straight part of the side track. Any car or engine on the side track between F and D would be in a position to be fouled by a train passing on the main track, while a car or engine on the side track beyond the point D would be clear of trains passing on the main track. An engine or car G standing or passing at the position shown in the drawing will short circuit the battery C, thus cutting off current from the relay A and permitting the armature of A to fall back and open the motor circuit. If the track is clear, that is, if no car or engine is on the track between points C and D, then the relay A is held closed and the motor circuit is closed. If a car is on the track between F and D, the question of the open or closed condition of the motor circuit will depend upon the position of the switch F, as will be hereinafter set forth.

The operation is as follows: Normally the motor circuit is closed and the signal E indicates a clear track for through trains the relay being energized through the following circuit: battery C, one track of section C—F, loop 10, one track of section S, conductor 9, relay A, conductor 7, switch blade $h$, conductor 8, the other track of section S, loop 11, loop 4, $g$, 3, and back to battery C. Assuming a train coming from the left with the intention of going upon the side track. As soon as the head of the train enters upon the section between C and F the relay A will be short circuited and the signal E will be moved to stop indication, as a warning to trains coming from the opposite direction. The track switch F is then shifted and the train moves up the side track S. Such shifting of F causes switch blades $g$ and $h$ to disconnect contacts $a$—$b$ and $c$—$d$ respectively and connection of contacts $e$ and $f$ by blade $g$. When the rear of the train leaves the section between C and F the motor circuit is not closed because the switch F is still in its shifted position and the loop wire 3 is shifted from connection with wire 4 to connection with wire 5, and wire 5 terminates in a contact which is open when the relay A is not previously energized. If the switch F is thrown for through train movements on the main track before the rear of the train on the side track has passed beyond the point D, then the connection of the main track section with the side track section through the loops 3, 4 10 and 11 will cause the rear end of the train to short circuit the relay A until the train is completely beyond the point D. By this means the signal E is held at danger or stop indication until the train on the side track is entirely clear of trains moving on the main track. The same result is obtained when a train on the side track in passing out moves beyond the point D before the switch F is shifted to permit the train to pass to the main track. In this case the signal E, which previously stood at proceed indication, is immediately reversed to show stop indication by the train short-circuiting the relay A through the side track.

In ordinary train movements from the side track to the main track, the switch F is first set for such movement, which setting shifts the electrical connections on the switch B. In this case the train in passing beyond the point D does not short circuit the relay A because part of the circuit necessary to effect such short circuit passes through the branch 8 which is open on the switch B by reason of shifting switch F, and because the relay still receives current through the following circuit: C, 3, $j$, $g$, 5, armature of A, 6, A, 9, 10, C. When the head of the train reaches the electrically connected section of main track beyond the switch F, the relay A will be short circuited from rail to rail directly through the axle of the engine, and the signal will be immediately thrown to danger indication by the opening of the motor circuit. This condition will be maintained until the rear of the train has passed beyond that section of the main track which is served by the battery C. When this last occurs the signal E will be automatically set to show clear track.

We claim as our invention:

1. In a block signaling system, the combination of a main track and a side track and a track switch adapted to be set to connect or to disconnect said tracks, the main track section at the outside of and adjacent said switch being insulated and the side track section adjacent said switch being insulated, a signal adjacent said switch, a relay for controlling the operation of said signal, a source of current connected with the main track insulated section, an electrical switch mechanically connected with said track switch to be operated upon setting of the latter, circuit connections for connecting said relay with both rails of the side track insulated section, circuit connections for connecting both rails of said main track section to the respective rails of the said side track section, both sets of said circuit connections being controlled by said electrical switch and closed when said switch has been adjusted to one position by the setting of the track switch to mechanically disconnect the track sections whereby entrance of a train on either of said sections will affect the circuit connections to cause deënergization of said relay, a shunt circuit connection from said main track section to said relay, contacts controlled by said relay and included in said shunt circuit, said shunt circuit connection being controlled by said electrical switch when said switch is shifted to another position by the setting of said track switch to connect the main track and side track sections whereby said relay will be controlled independently of train movement on said side track section.

2. In a block signaling system, the combination of a main track and a side track and a track switch for connecting or disconnecting said tracks, the rails of said tracks being insulated from direct contact with each other, an electrically controlled signal at said switch, a relay for controlling the electrical circuit for said signal, a source of current bridged across the main track, circuit connections connecting one terminal of said relay with one rail of each of said track sections, a second circuit connection connecting the other terminal of said relay with the other rail of said side track and a third circuit connection from said other side track rail to the other rail of said main track, electrical switch mechanism mechanically connected with the track switch, said switch mechanism being in position to close said second circuit connection and said third circuit connection when said track switch has been set to disconnect the side track from the main track whereby the entrance of a train on either track will change the circuit conditions to effect deënergization of said relay, a shunt circuit connection from said main track section to said relay, contacts controlled by said relay and included in said shunt circuit said shunt circuit being under the control of said electrical switch mechanism, setting of said track switch to connect the tracks causing adjustment of the switch mechanism to open said second circuit connection and said third circuit connection and to close said shunt circuit connection whereby said relay operation becomes independent of said side track.

3. In a block signaling system, the combination of an insulated main track section and an insulated side track section and a switch for mechanically connecting said sections, a source of current connected with said main track section, a signal adjacent said switch, a relay for controlling the operation of said signal, an electrical switch connected with said track switch to be moved upon setting of said track switch, circuit connections controlled by said electrical switch for connecting said track sections together, circuit connections controlled by said electrical switch for connecting said relay with said side track section, said electrical switch when in one position closing said circuit connections whereby the passage of a train over either track section will cause response of said relay, a direct circuit connection controlled by said switch mechanism for connecting said relay directly with said main track section, and contacts for said relay included in said direct circuit connection, said electrical switch mechanism when moved to another position causing closure of said direct circuit connection and opening of said first mentioned circuit connections whereby said relay will respond only to passage of a train over the main track section.

4. In a block signaling system, the combination of an insulated main track section and an insulated side track section and a switch for mechanically connecting said sections, a source of current connected with said main track section, a signal adjacent said switch, a relay for controlling the operation of said signal, an electrical switch connected with said track switch to be moved upon setting of said track switch, circuit connections controlled by said electrical switch for connecting said track sections together, circuit connections controlled by said electrical switch for connecting said relay with said side track section, said electrical switch when in one position closing said circuit connections whereby the passage of a train over either track section will cause response of the relay, a direct circuit connection controlled by said switch mechanism for connecting said relay directly with said main track section, said electrical switch mechanism when moved to another position causing closure of said direct circuit connection and opening of said first mentioned circuit connections whereby said relay will respond only to passage of a train over the main track section, and contacts controlled by said relay and included in said direct circuit connection.

JOSEPH BEAUMONT.
FREDERICK G. WHITE.

Witnesses:
ALBERT H. GRAVES,
EMILIE ROSE.